July 8, 1969     G. R. FEASTER ET AL     3,453,768

PLANING FISH LURE WITH SCENT DISPENSER

Filed June 12, 1967

Guy R. Feaster
Miles B. Larson
INVENTORS

United States Patent Office 3,453,768
Patented July 8, 1969

3,453,768
PLANING FISH LURE WITH SCENT
DISPENSER
Guy R. Feaster, 11431 Bowles Ave., Garden Grove, Calif.
92641, and Miles B. Larson, 115 44th St., Newport
Beach, Calif. 92660
Filed June 12, 1967, Ser. No. 645,106
Int. Cl. A01k 85/00, 95/00, 91/00
U.S. Cl. 43—42.06                    7 Claims

ABSTRACT OF THE DISCLOSURE

A planing, scent-emitting and diffusing lure comprising two component parts, namely, a float and a complemental diving vane. A circular hollow shell has marginally joined convex half-sections providing a float which, in turn, is equipped with orientated elongated dorsal and ventral planing and direction guiding fins. The leading end of this float has a unique T-shaped rib keyed in a keyway with which the attachable end of the diving vane is provided.

This invention relates to a fishing lure which features a novel float with coacting elongated dorsal and ventral gliding and planing fins. The bottom or underneath side of the forward or leading end of said float is equipped with an oblique angled T-shaped rib which provides a key fittingly keyed in a companion keyway provided at the upper end of a structurally unique diving vane or rudder, more particularly, a sectional vane which is readily attachable and detachable.

In carrying out the objectives of the present invention, the float, as a unit, is constructed so that the fishing line can be attached in two different ways. First, the central forward end of the hollow shell is provided with a built-in sleeve or tube which is open at its upper and lower ends and the line can be threaded through the bore and can be freely slidable, or alternatively, knots or equivalent limit stops (such as split shots) can be provided to set and control the depth of the hook-equipped end of the line. Secondly, the forward or leading ends of the dorsal and ventral fins can be and preferably are provided with line holes, to the upper one of which the fish line is connected and to the lower one of which the leader is tied and thus connected. Hence, this lure is versatile with respect to facilities for connecting lines thereto.

More specifically, novelty is predicated on the diving vane or rudder in that it is not only bodily attachable and detachable, it comprises an upper hollow part wherein the hollow portion provides a chamber which contains a water soluble scent-emitting pill or the like and wherein the scent is emitted or dispensed by way of ports or orifices and is thus diffused into the water to attract the victim fish. This scent-dispensing chamber can be loaded or filled by way of the keying slot. Then, too, the lower part of the vane contains a suitable lead or an equivalent weight and this part can be detachably secured by an attaching and retaining stud with which it is provided.

This combination planing float and lure can be effectively used with a hand line, a line carried by a fishing pole of any convenient type, or with a reel-equipped casting or spinning rod. It follows that it does not have to be cast. In fact, it can be dropped or placed in a lake, stream or water by any angler with or without knowledge of casting with a rod and reel. It can be pulled and caused to plane forwardly for diving or the line can be released to pay out, whereby the float comes into play and reverses the direction of movement, whereupon the device then ascends and pops up through the water's surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 8 is an enlarged detail fragmentary view taken on the plane of the vertical section line 8—8 of FIG. 4.

Figure 1:
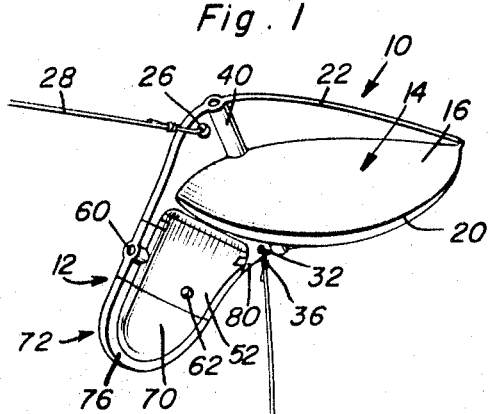
FIG. 1 is a view in perspective of a planing type fish lure with incorporated (not shown) scent material containing and dispensing means and with the line and leader attached in one of the selective ways of using the same.
Figure 2:
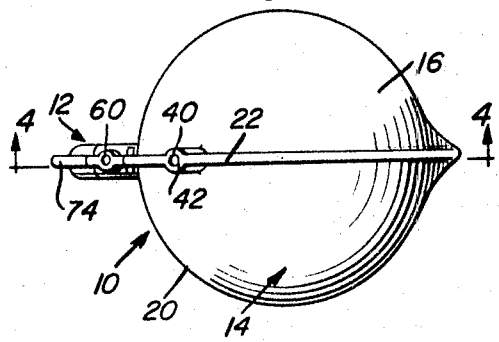
FIG. 2 is a top plan view of the device shown in FIG. 1 but with the line means omitted.
Figure 4:
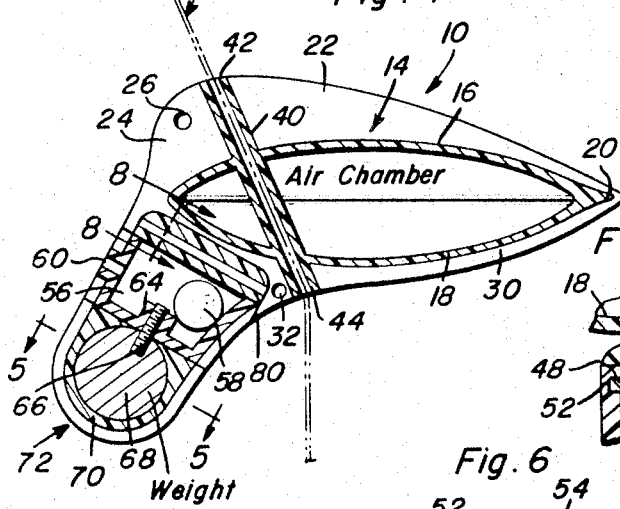
FIG. 4 is an enlarged view with parts in section and elevation taken approximately on the plane of the central section line 4—4 of FIG. 2 and showing an alternate use of the fishing line in phantom lines.
Figure 3:
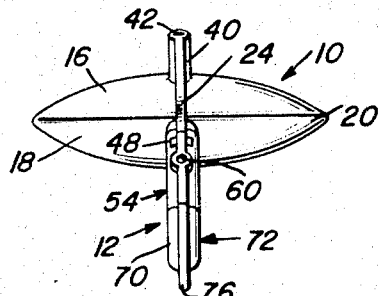
FIG. 3 is a front end elevational view based on FIG. 2 and looking in a direction from left to right.
Figure 7:
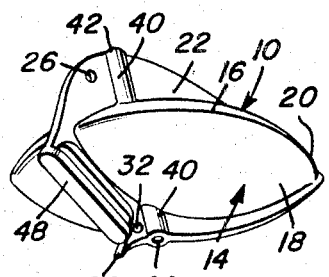
FIG. 7 is a view in perspective of the fin-equipped float with the diving vane detached to show the T-shaped keying rib.
Figure 6:
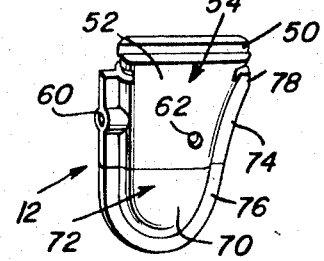
FIG. 6 is a view in perspective of the bodily attachable and detachable diving vane, alternatively, the rudder.
Figure 5:
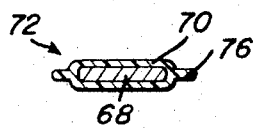
FIG. 5 is a cross section on the section line 5—5 of FIG. 4.

The combination planing float and dispensing lure is characterized, generally speaking, by two companion component parts or units one of which is denoted by itself in FIG. 7 and is designated by the numeral 10, the complemental part or unit being denoted by the numeral 12 and shown with particularity in FIG. 6. The part or unit 10 is characterized by a hollow circular buoyant shell which, in a general way, represents a clam shell and which is denoted by the numeral 14. It comprises companion upper and lower concavo-convex half sections 16 and 18 whose marginal edges are suitably joined together as denoted at 20. The hollow portion of the shell provides an air chamber in the manner shown in FIG. 4. To achieve the desired guidance and planing function the upper central convex surface of the float is provided with a dorsal fin 22 which gradually increases in height or cross-sectional dimension from the rearward trailing end (at the right in FIG. 4) to the forward leading end as at 24 where it is provided with a line-attaching hole 26 to which an end portion of a fishing line 28 is attached in the manner shown in FIG. 1. The complemental fin 30 is designated as the ventral fin and the forward end portion is provided with a similar line hole 32 which can be used in the manner shown in FIG. 1 and wherein a leader 34 has its upper end 36 attached and its lower end provided with a fishhook 38. This float unit, in addition to the fins, is also provided with an optionally usable line adapter which is described as a built-in sleeve or tube 40 and the upper and lower ends 42 and 44 are open to accommodate a fishing line 46. This is an alternate line and it can be threaded through the bore of the tube as shown in phantom lines (FIG. 4). Accordingly, the line can be allowed to slide freely or it can be provided with upper and lower knots or split shot which serve as limit stops (not shown) whereby to permit the use of a free line or a depth controlled or locked line. While it is realized that lures with free sliding and lockable lines are not new in the art, the built-in tube constituting an integral feature of the novel finned float here is believed to be unique particularly wherein the forward ends of the fins are provided with holes 26 and 32 to accommodate the line components 28 and 34 as shown in FIG. 1. The underneath central portion of the unit 10 is also provided with an integral substantially T-shaped assembling and keying rib which is denoted at 48 and which can be slidingly keyed into keyways 50 provided therefor in the upper slotted end portion 52 of the ruddering and diving vane 12. Not only is this vane a novel complement of the float, it is unique in and of itself in that it comprises an upper part or section 54 the hollow portion of which provides a chamber 56 which as shown in FIG. 4 is adapted to contain a water soluble pill or the like 58 which when dissolved serves to diffuse the scented media or material into the water which is being fished. The dispensing ports or orifices 60 and 62 facilitate the dispensing step. It will be noted that the bottom of the chamber is provided with a screw-threaded socket member 64 to accommodate a stud 66 which is carried by a marginal portion of a weight 68 which is contained in the receiver portion 70 of the attachable and detachable weighted section 72. These two sections fit together as shown and are marginally provided with fins 74 and 76 which together provide a substantially U-shaped fin which cooperates with the leading ends of the aforementioned dorsal and ventral fins 22 and 30. There is an abutment 78 provided to contact a limit stop shoulder 80 in the manner shown in FIG. 4.

As can now be understood this floatable vane-equipped and fin-equipped device, when properly handled, planes through the water in a gliding manner. It can be maneuvered and caused to move farther into the water in a manner to increase the effective distance of casting. The fisherman can accomplish this movement away from him by tugging on the fish line. This step causes the planing fish lure with scent dispenser to move toward him and to dive steeply into the water at the same time. Then when the fisherman releases and pays out the line the device rises to the surface and at this same time the device planes through the water away from the fisherman and breaks through the surface of the water several feet further from the fisherman than where it was when the fisherman first tugged on the line to make the lure dive.

What is claimed as new is as follows:

1. A planing fishing lure comprising a buoyant shell constituting a float and having top and bottom surfaces provided with cooperating dorsal and ventral direction guiding fins, said fins being straight from end to end and gradually increasing in transverse cross-section from their trailing ends toward their leading ends, the leading end of said float having a depending forwardly and downwardly angle diving vane disposed generally in the plane of the fins, and means for the attachment thereto of a fishing line.

2. The fishing lure defined in and according to claim 1, and wherein said diving vane is aligned with leading ends of said fins and is detachably mounted and is marginally encompassed by fins which are aligned with each other and are cooperable with said leading ends of said dorsal and ventral fins, respectively, to achieve the nose-diving and line-controlling planing results desired.

3. The fishing lure defined in and according to claim 2, and wherein said diving vane comprises a pair of upper and lower component parts which are coplanar and are disposed in separably connected abutting end-to-end relationship.

4. The fishing lure defined in and according to claim 3, and wherein said lower part is provided with an enclosed lead weight and means positively but detachably joined to an abutted surface of the companion upper part.

5. The fishing lure defined in and according to claim 4, and wherein said last-mentioned means comprises an integral laterally projecting screw-threaded assembling and retaining stud which is screwed into a screw-threaded socket embodied for that purpose in the oriented surface of said upper part.

6. The fishing lure defined in and according to claim 3, and wherein said upper part is hollow, is provided with scented media dispensing ports and provides a chamber which is capable of and adapted to enclose water soluble scent diffusing media in paste or pill form, as desired.

7. The fishing lure defined in and according to claim 5, and wherein said upper part is hollow, is provided with scented media dispensing ports and provides a chamber which is capable of and adapted to enclose water soluble scent diffusing media in paste or pill form, as desired.

References Cited
UNITED STATES PATENTS

| | | | |
|---|---|---|---|
| 2,179,641 | 11/1939 | Layfield | 43—42.39 |
| 2,187,609 | 1/1940 | Larson | 43—42.35 |
| 2,937,467 | 5/1960 | Capps | 43—42.06 |
| 3,363,359 | 1/1968 | Oney | 43—42.39 |

SAMUEL KOREN, *Primary Examiner.*

DANIEL J. LEACH, *Assistant Examiner.*

U.S. Cl. X.R.

43—42.09, 42.35, 42.39, 43.13